No. 857,690. PATENTED JUNE 25, 1907.
W. C. TOON.
MULTIPLE DRILL PRESS.
APPLICATION FILED SEPT. 26, 1906.
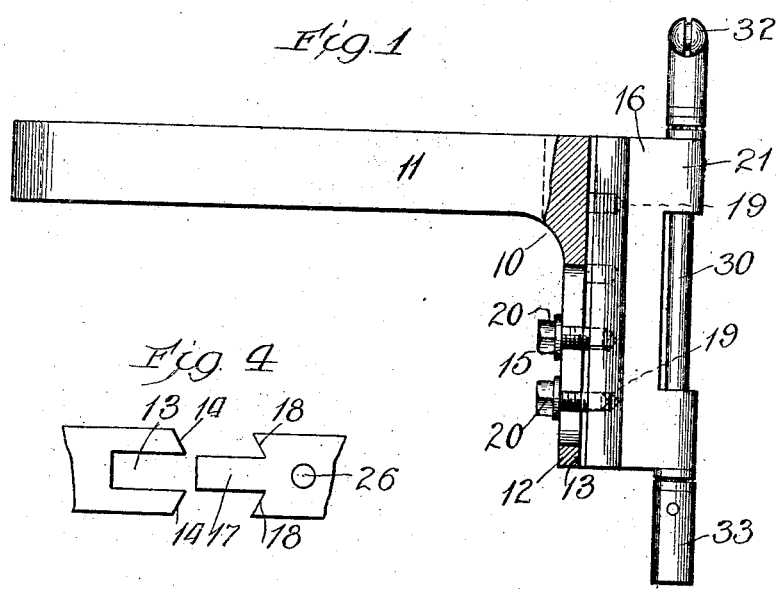
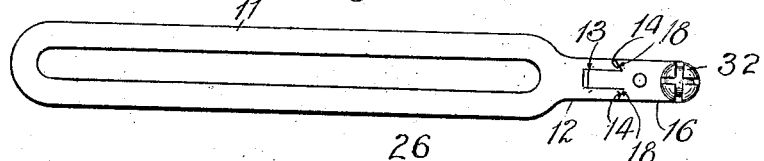
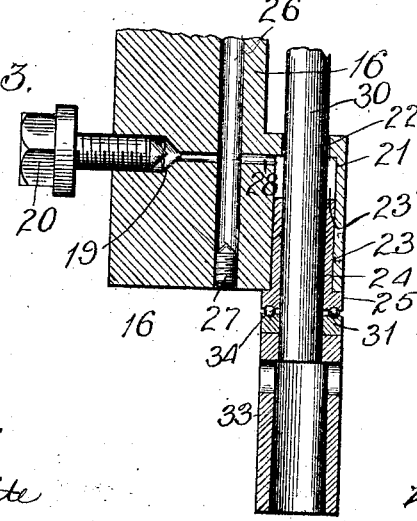
Witnesses:
Harry R. Lewlite
Ray White
Inventor:
William C. Toon,
By Goree Bain and May
Attys.
THE NORRIS PETERS CO., WASHINGTON, D. C.

UNITED STATES PATENT OFFICE.

WILLIAM C. TOON, OF CHICAGO, ILLINOIS.

MULTIPLE-DRILL PRESS.

No. 857,690.	Specification of Letters Patent.	Patented June 25, 1907.

Application filed September 26, 1906. Serial No. 336,287.

*To all whom it may concern:*

Be it known that I, WILLIAM C. TOON, a citizen of the United States, residing at Chicago, in the county of Cook and State of Illinois, have invented certain new and useful Improvements in Multiple-Drill Presses, of which the following is a specification.

My invention relates to improvements in multiple drill presses, and more particularly to the fittings of such presses comprising the means for supporting and adjusting the drill spindle.

In multiple drill presses it is customary to provide for each drill spindle a head wherein the spindle rotates, and a bracket, adjustably connected to the frame of the press, and supporting the head, which is vertically adjustable thereon. Such general arrangement of parts is maintained in my invention, but I provide such construction and arrangement of parts as to accomplish the following objects; to minimize the width of the combined head and bracket for any given style of drill, to prevent lateral bending of the head under severe strain; to facilitate application of the head to, and its adjustment relative to, the bracket; to provide against wearing of the head, so that it may be practically indestructible, to provide readily removable bushings for taking the wear; to provide in the device an oil reservoir which will supply the spindle bearings with oil for a considerable length of time; and to so arrange the parts that the head is reversible on the bracket.

Other and further objects may best be understood from the following description, taken in conjunction with the accompanying drawing, wherein;

Figure 1 is a side elevation of the bracket, head, and spindle fittings. Fig. 2 is a plan view. Fig. 3 is an enlarged vertical section of one end of the spindle and head, and, Fig. 4 is an enlarged detail.

Throughout the drawing like numerals of reference refer always to like parts.

The bracket 10 comprises a slotted arm 11, of usual configuration, adapted for attachment to the frame of a multiple drill-press, and a body 12, extending at substantially right angles to the arm 11 and throughout its front edge grooved, as at 13, and oppositely chamfered as at 14—14, from the edges of the groove to the sides of the body. A slot, 15, extending longitudinally of the body, to open communication between the groove 13 and the rear face of the body is also provided.

The head, 16, which, as usual, is of relatively soft metal, such as brass, is preferably of about the length and width of the bracket-body, and is provided along its rear edge with a tongue 17, shaped to fit smoothly in the groove, 13, and flanked by angular grooves, 18, into which the chamfered portions 14 of the bracket body fit. At different points in its length the tongue 17 is provided with screw holes 19, into which may take screws 20, taking through the slot 15 and binding on the body 12 of the bracket, to secure the body and head firmly together. Obviously adjustment of the head relative to the body through quite a range may readily be accomplished.

From the front of the head extend bearing projections 21, bored as at 22 for the loose reception of a spindle, and at their opposite ends counterbored as at 23 to a suitable depth. In the counterbores 23 are seated, with tight fit, bushings 24, of hard metal, preferably flanged as at 25 at their outer ends and grooved annularly to form a ball race for a thrust-bearing. The bushings 24 are of less depth than the counterbores 23, to leave open portions 23′ of the counterbores, which serve as oil channels. Through the head is provided a channel 26, closed at one end by a screw plug 27, and having communication through small holes 28 with the channels 23′, so that oil supplied to the open upper end of the channel 26 may flow to the channels 23′ to oil the bearings.

30 indicates the spindle, near each end fitted with a collar 31, grooved to form a ball race, and at its opposite extremities fitted, in any usual manner, with a flexible joint connection 32 and a tool holder 33.

Balls 34 interposed between the collars 32 and bushing-flanges 25 complete the ball thrust bearings.

In operation the head is secured to the bracket in proper position of adjustment by one or more of the screws 20, and when so secured is firmly held against lateral distortion by the engagement of the tongue 17 in the groove 13, the annular joints between the bracket and head on both sides of the tongue, aiding in binding the parts accurately and preventing strain from being localized on the tongue. The hardened bushings 24, which alone receive the wear incident to the rotation of the spindle, may be readily tempered to best withstand such wear, and prevent the destruction of the head by enlargement of the lower end of the spindle aperture through its projections 21, which takes place in ordinary heads. Further, since the wear is particularly severe on the lower bearing, the life of the complete fitting may be lengthened by reversal of the head, which may be accomplished with only the removal of the plug 27 from one end of the oil channel to the other, and, of course, the turning of the spindle end for end.

The bushings, when worn, may be removed, by inserting through the bore 22 a tool with an expansion head to engage under the end of the bushing and permit its being driven out.

Having thus described my invention, what I claim and desire to secure by Letters Patent of the United States, is:

1. The combination with a bracket having a body grooved along its front edge, and slotted through its rear edge on the line of the groove, of a reversible head provided with a tongue for engagement in the groove, and a screw, taking through the slot, engaging the tongue.

2. In a drill press, a spindle supporting arm provided with a spindle receiving opening counterbored at each end, said arm provided with a lubricating-oil reservoir having conduits leading to said counterbores, spindle thrust bearings seated in said counterbores, shouldered near their outer ends to provide enlargements for annular grooves for balls, and a spindle having enlargements on its respective ends in which to provide annular grooves for the respective coacting members of said bearings, and balls in said grooves.

In testimony whereof I hereunto set my hand in the presence of two witnesses.

WILLIAM C. TOON.

In the presence of—
J. F. HARDY,
W. A. BERNARD.